(12) United States Patent
Jiang et al.

(10) Patent No.: US 12,541,787 B2
(45) Date of Patent: Feb. 3, 2026

(54) COMPUTER-IMPLEMENTED METHOD, METHOD OF ITEM RECOMMENDATION, APPARATUS, AND COMPUTER-PROGRAM PRODUCT

(71) Applicants: Beijing BOE Technology Development Co., Ltd., Beijing (CN); BOE Technology Group Co., Ltd., Beijing (CN)

(72) Inventors: Boran Jiang, Beijing (CN); Chao Ji, Beijing (CN); Pengfei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 284 days.

(21) Appl. No.: 18/553,193

(22) PCT Filed: Nov. 29, 2022

(86) PCT No.: PCT/CN2022/134946
§ 371 (c)(1),
(2) Date: Sep. 28, 2023

(87) PCT Pub. No.: WO2024/113149
PCT Pub. Date: Jun. 6, 2024

(65) Prior Publication Data
US 2025/0078135 A1    Mar. 6, 2025

(51) Int. Cl.
*G06Q 30/00* (2023.01)
*G06N 3/042* (2023.01)
(Continued)

(52) U.S. Cl.
CPC ......... *G06Q 30/0631* (2013.01); *G06N 3/042* (2023.01); *G06N 3/048* (2023.01)

(58) Field of Classification Search
CPC ... G06Q 30/06–08; G06N 3/042; G06N 3/048
See application file for complete search history.

(56) References Cited

U.S. PATENT DOCUMENTS

2019/0036797 A1* 1/2019 Margalit .................. H04L 41/22
2021/0110457 A1* 4/2021 Polanía .................. G06V 20/00
(Continued)

FOREIGN PATENT DOCUMENTS

| CN | 109994201 A | 7/2019 |
| CN | 110083770 A | 8/2019 |

(Continued)

OTHER PUBLICATIONS

International Search Report & Written Opinion mailed Jul. 27, 2023, regarding PCT/CN2022/134946.

(Continued)

*Primary Examiner* — Ethan D Civan
(74) *Attorney, Agent, or Firm* — Intellectual Valley Law, P.C.

(57) ABSTRACT

A computer-implemented method is provided. The computer-implemented method includes obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model. Vectors of m number of dimensions are used to represent an individual entity in the graph neural network model, (m−1) dimensions out of m dimensions represent (m−1) number of attributes, and one out of the m dimensions represents a flag bit. Constructing the graph neural network model includes performing self-attention on the individual (Continued)

entity, during which the flag bit is converted into a fused flag bit by fusing the individual entity's own attributes.

20 Claims, 5 Drawing Sheets

(51) Int. Cl.
  *G06N 3/048* (2023.01)
  *G06Q 30/0601* (2023.01)

(56) References Cited

U.S. PATENT DOCUMENTS

| | | |
|---|---|---|
| 2021/0248445 A1 | 8/2021 | Zhou et al. |
| 2022/0366188 A1* | 11/2022 | Jindal .................... G06F 40/30 |

FOREIGN PATENT DOCUMENTS

| | | |
|---|---|---|
| CN | 112232925 A | 1/2021 |
| CN | 112507132 A | 3/2021 |
| CN | 112836125 A | 5/2021 |
| CN | 114328763 A | 4/2022 |
| CN | 114491055 A | 5/2022 |

OTHER PUBLICATIONS

Li et al., "Double End Knowledge Graph Convolutional Neworks for Recommender Systems", Journal of Frontiers of Computer Science and Technology, 1673-9418/2022/16(01)-0176-09.
Ouyang et al., "Dual Knowledge Multimodal Network for Recommender System", https://snap.stanford.edu/class/cs224w-2019/project/26425009.pdf.

* cited by examiner

COMPUTER-IMPLEMENTED METHOD, METHOD OF ITEM RECOMMENDATION, APPARATUS, AND COMPUTER-PROGRAM PRODUCT

CROSS-REFERENCE TO RELATED APPLICATION

This application is a national stage application under 35 U.S.C. § 371 of International Application No. PCT/CN2022/134946, filed Nov. 29, 2022, the contents of which are incorporated by reference in the entirety.

TECHNICAL FIELD

The present invention relates to display technology, more particularly, to a computer-implemented method, a method of item recommendation, an apparatus, and a computer-program product.

BACKGROUND

Electronic commerce (EC) greatly facilitates the buying and selling of products over electronic systems on the Internet and computer networks. With rapid development of electronic commerce, a large number of products become available from the online retailer. Often it may be difficult for a consumer to find the products the consumer wants to purchase. Accordingly, item recommendation technology has been developed to recommend one or more products for the consumer's consideration.

SUMMARY

In one aspect, the present disclosure provides a computer-implemented method, comprising obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model; wherein vectors of m number of dimensions are used to represent an individual entity in the graph neural network model, (m−1) dimensions out of m dimensions represent (m−1) number of attributes, and one out of the m dimensions represents a flag bit; wherein constructing the graph neural network model comprises performing self-attention on the individual entity, during which the flag bit is converted into a fused flag bit by fusing the individual entity's own attributes.

Optionally, constructing the graph neural network model further comprises performing neighborhood aggregate operation to aggregate information on the individual entity and adjacent entities.

Optionally, a total number of dimensions of a vector representing the individual entity is m×d; wherein the self-attention on the individual entity is performed according to:

$$V' = \text{soft max}\left(\frac{V_q \cdot V_k^T}{\sqrt{d}}\right)V_v;$$

wherein V' stands for a vectorized representation of the individual entity subsequent to the self-attention; the vectorized representation subsequent to the self-attention comprises the fused flag bit; $V_q = W_q \cdot V$, $V_k = W_k \cdot V$, and $V_v = W_v \cdot V$; V stands for a vectorized representation of the individual entity prior to the self-attention; and $W_q$, $W_k$, and $W_v$, are learnable parameters with dimensions of d*d.

Optionally, constructing the graph neural network model further comprises performing attention on a triple comprising the individual entity, an adjacent entity, and a respective relationship between the individual entity and the adjacent entity.

Optionally, the attention on the triple is performed according to:

$$Z = \text{soft max}\left(\frac{(V'r_1) \cdot H'^T}{\sqrt{d}}\right) \cdot H';$$

wherein Z stands for a vectorized representation subsequent to the attention on the triple; Z is of m*d dimensions; V' stands for a vectorized representation subsequent to the self-attention performed on the individual entity; H' stands for a vectorized representation subsequent to a self-attention performed on the adjacent entity; r1 stands for a relationship between V' and H'; and d stands for a number of dimensions of the respective attribute.

Optionally, the vectorized representation V' subsequent to the self-attention performed on the individual entity comprises the fused flag bit; and during the attention performed on the triple, the fused flag bit is processed into a processed flag bit by fusing the individual entity's own attributes and the adjacent entity's attributes.

Optionally, the individual entity has a vectorized representation of m*d dimensions; the adjacent entity has a vectorized representation of n*d dimensions; and the relationship has a vectorized representation of d*d dimensions.

Optionally, the neighborhood aggregate operation is performed according to $agg_{sum} = \sigma(W \cdot (Z_0 + Z_{S(v)}) + b)$; wherein a stands for an activation function; $Z_0$ stands for a fused flag bit obtained subsequent to performing the self-attention on the individual entity; W stands for a weight; b stands for a bias factor; $Z_{S(v)} = Z_0^1 + Z_0^2 + \ldots + Z_0^n$; and $Z_0^1, Z_0^2, \ldots, Z_0^n$ stand for processed flag bits obtained subsequent to performing attention on triples respectively with respect to the adjacent entities that have a direct relationship with the individual entity, respectively.

Optionally, constructing the graph neural network model further comprises updating the flag bit in the vectorized representation of the individual entity with a result of the neighborhood aggregate operation $agg_{sum} = \sigma(W \cdot (Z_0 + Z_{S(v)}) + b)$, thereby obtaining an updated flag bit.

Optionally, the neighborhood aggregate operation is performed according to a weighted sum operation on the adjacent entities using similarities as weights.

Optionally, performing the vectorized representation on a respective attribute comprises performing a vectorized representation on an attribute of a numeric type.

Optionally, performing the vectorized representation on the attribute of the numeric type comprises randomly initializing a d-dimensional unit vector, wherein the d-dimensional unit vector follows a Gaussian distribution; wherein the d-dimensional unit vector is denoted as a basis vector $E_d$; the basis vector $E_d$ is expressed as $E_d = [e_1, e_2, \ldots, e_d]$, wherein $e_1, e_2, \ldots, e_d$ stand for a unit vector in d number of dimensions; a respective attribute of the numeric type is denoted as $x_i$; and the vectorized representation on the attribute of the numeric type is expressed as $e_{NE}$ [$x_i \cdot e_1$, $x_i \cdot e_2$, ..., $x_i \cdot e_d$].

Optionally, performing the vectorized representation on a respective attribute comprises performing a vectorized representation on an attribute of a semantic type; and performing the vectorized representation on the attribute of a semantic type comprises initialization encoding using a self-attention model; wherein the computer-implemented method further comprises inputting an input data of m dimensions; and encoding the input data and converting the input data into an encoded data of n dimensions; m and n are positive integers, n<m; wherein the input data is the vectorized representation of attribute values generated by the self-attention model.

Optionally, the computer-implemented method further comprises obtaining a product of a vectorized representation of a respective user and an updated vectorized representation of the individual entity; wherein, in the updated vectorized representation of the individual entity, the flag bit is updated with a result of a neighborhood aggregate operation; the product of the vectorized representation of the respective user and the updated vectorized representation of the individual entity is expressed as $\hat{y}_{uv}=ru \cdot V''$; wherein ru stands for the vectorized representation of the respective user; and $V''$ stands for the updated vectorized representation of the individual entity.

Optionally, the computer-implemented method further comprises training the graph neural network model using a loss function expressed as $L=\Sigma_{u \in U}(\Sigma_{v:y_{uv}=1} C(y_{uv}, \hat{y}_{uv}) - \Sigma_{v:y_{uv}=0}^{T^u} C(y_{uv}, \hat{y}_{uv})) + \lambda \|\varepsilon\|_2^2$; wherein C stands for a cross-entropy loss; $\lambda \|\varepsilon\|_2^2$ denotes a L2 regularization of parameters of the graph neural network model; $y_{uv}$ stands for a true label of a sample; $\hat{y}_{uv}$ stands for an output of the graph neural network model; and $T^u$ stands for a number of negative samples.

Optionally, the graph neural network is an item graph neural network model configured to recommend an item to a user; the vectorized representation of the individual entity is a vectorized representation of a respective item; and the respective item is an item that has a relationship, direct or indirect, with the user.

In another aspect, the present disclosure provides a method of item recommendation, comprising receiving a request for item recommendation from a user; obtaining the user's preference probabilities for items based on the graph neural network model constructed according to the computer-implemented method described herein; and outputting a list of item recommendations based on the preference probabilities.

Optionally, obtaining the user's preference probabilities for items based on the graph neural network model comprises determining similarities in relationship space between a respective item of the items and head entities of one or more adjacent triples, respectively, a respective head entity of the head entities being an entity having a direct relationship with the respective item; obtaining a first order vectorized representation for the user by performing a weighted sum operation on tail entities of the one or more adjacent triples using the similarities as weights, respectively, thereby completing a first propagation; reiterating the determining and obtaining process for (H−1) number of times along a propagation path in the graph neural network model, thereby obtaining an H-th order vectorized representation for the user, H being a positive integer, a tail entity in a previous propagation being a head entity in a present propagation along the propagation path; and obtaining a product of the H-th order vectorized representation for the user and a vectorized representation of the respective item, thereby obtaining the user's preference probability with respect to the respective item.

In another aspect, the present disclosure provides an apparatus, comprising a memory; one or more processors; wherein the memory and the one or more processors are connected with each other; and the memory stores computer-executable instructions for controlling the one or more processors to obtain one or more attributes of one or more entities; perform a vectorized representation on a respective attribute of the one or more attributes, the vectorized representation being encoded as a vector of d dimensions; and performing computation on vectorized representation of the one or more attributes based on attention mechanism to construct a graph neural network model; wherein vectors of m number of dimensions are used to represent an individual entity in the graph neural network model, (m−1) dimensions out of m dimensions represent (m−1) number of attributes, and one out of the m dimensions represents a flag bit; wherein, in constructing the graph neural network model, the memory stores computer-executable instructions for controlling the one or more processors to perform self-attention on the individual entity, during which the flag bit is converted into a fused flag bit by fusing the individual entity's own attributes.

In another aspect, the present disclosure provides a computer-program product, comprising a non-transitory tangible computer-readable medium having computer-readable instructions thereon, the computer-readable instructions being executable by a processor to cause the processor to perform obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model; wherein vectors of m number of dimensions are used to represent an individual entity in the graph neural network model, (m−1) dimensions out of m dimensions represent (m−1) number of attributes, and one out of the m dimensions represents a flag bit; wherein constructing the graph neural network model comprises performing self-attention on the individual entity, during which the flag bit is converted into a fused flag bit by fusing the individual entity's own attributes.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method, a method of item recommendation, an apparatus, and a computer-program product that substantially obviate one or more of the problems due to limitations and disadvantages of the related art. In one aspect, the present disclosure provides a computer-implemented method. In some embodiments, the computer-implemented method includes obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model. Optionally, vectors of m number of dimensions are used to represent an individual entity in the graph neural network model. Optionally, (m−1) dimensions out of m dimensions represent (m−1) number of attributes, and one out of the m dimensions represents a flag bit. Optionally, constructing the graph neural network model comprises performing self-attention on the individual entity, during which the flag bit is converted into a fused flag bit by fusing the individual entity's own attributes.

Figure 1A:
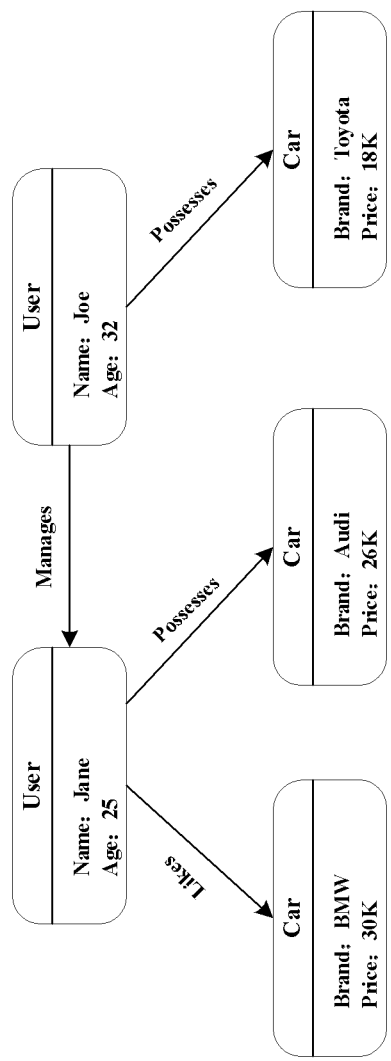
FIG. 1A illustrates an example of an attribute graph in some embodiments according to the present disclosure.

An attribute graph includes vertexes, edges, labels, relationship types, and attributes. FIG. 1A illustrates an example of an attribute graph in some embodiments according to the present disclosure. Referring to FIG. 1A, the attribute graph includes five nodes (vertexes), each node having a node attribute. Relationships among the nodes are edges of the attribute graph. Specifically, the attribute graph in FIG. 1A includes three different relationship types ("likes", "possesses", "leads"). The attribute graph further includes labels such as "user", and "car". In constructing the attribute graph, items are connected through the graph structure based on relationships among the items.

An attribute graph is a particular type of knowledge graphs. A knowledge graph is a graph that integrates information into an ontology and applies a reasoner to derive new knowledge. A knowledge graph includes a network of entities, for example, includes entities and one or more relationships between entities. In one example, an attribute graph further includes at least one triple comprising an entity, an attribute, and an attribute value. The attribute graph can better represent entity information, and enables vectorized representation of entity information based on attribute information.

In some embodiments, the attribute graph includes one or more triples. Optionally, the attribute graph includes triples of different types. Optionally, the attribute graph includes one or more triples of a first type and one or more triples of a second type. Optionally, the triple of the first type includes a first entity, a second entity, and a relationship between the first entity and the second entity. Optionally, the triple of the second type includes an entity, an attribute of the entity, and an attribute value of the attribute.

Figure 1B:
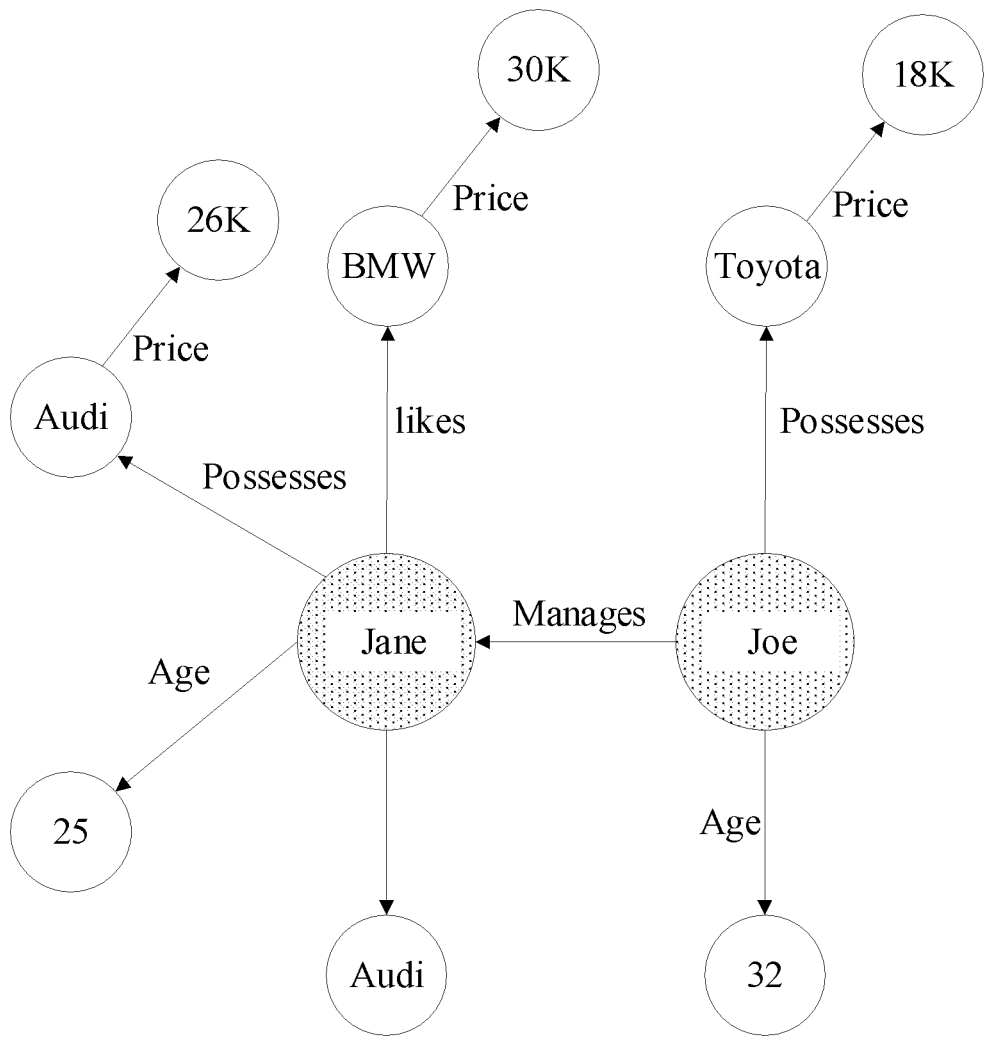
FIG. 1B illustrates an example of an attribute graph in some embodiments according to the present disclosure.

FIG. 1B illustrates an example of an attribute graph in some embodiments according to the present disclosure. Referring to FIG. 1B, examples of triples of the first type include [Joe-manages-Jane], wherein Joe and Jane are two entities, and "manages" is a relationship between two entities. Another example of triples of the first type may be [Jane-possesses-Audi], wherein Jane and Audi represent two entities, and "possesses" represents a relationship between two entities. An example of triples of the second type may be [Joe-Age-32], wherein Joe stands for an entity, "Age" stands for an attribute of the entity, and "32" stands for an attribute value of the attribute. Another example of triples of the second type may be [BMW-Price-30K], wherein "BMW" is an entity, "Price" is an attribute of the entity, and "30K" is an attribute value of the attribute "Price".

In another example, in a movie knowledge graph, (Forrest Gump, filming location, USA) represents a set of triple, in which an entity, an attribute, and an attribute value are represented respectively. In the triple, an attribute value of the attribute "filming location" is "USA".

Figure 2:
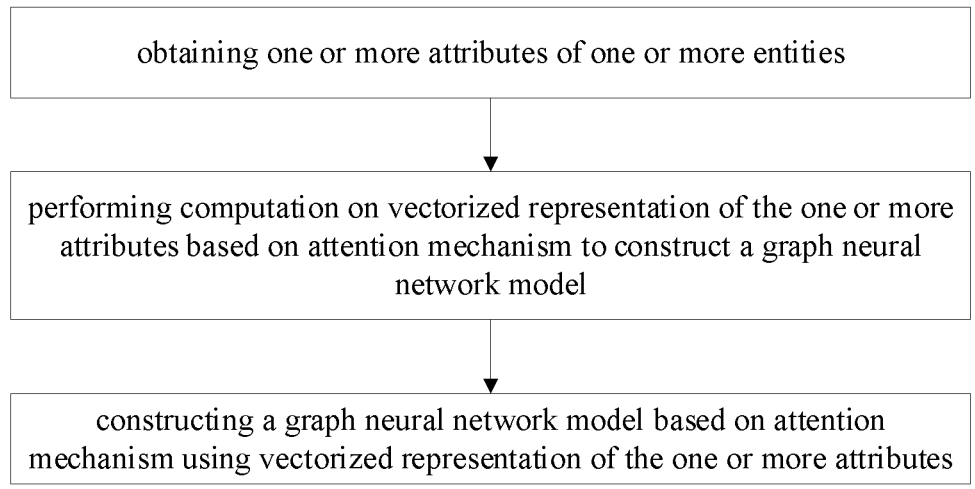
FIG. 2 is a flow chart illustrating a computer-implemented method in some embodiments according to the present disclosure.

FIG. 2 is a flow chart illustrating a computer-implemented method in some embodiments according to the present disclosure. Referring to FIG. 2, the computer-implemented method includes obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model. Performing a vectorized representation on a respective attribute of the one or more attributes may include converting nodes, relationships, and attribute values into vectors. Various appropriate algorithms may be used for performing the vectorized representation. Optionally, constructing the graph neural network model further includes performing neighborhood aggregate operation to aggregate information on an individual entity and adjacent entities. Optionally, constructing the graph neural network model includes performing attention on a triple comprising the individual entity, an adjacent entity, and a respective relationship between the individual entity and the adjacent entity.

Accordingly, the term "performing computation on vectorized representation of the one or more attributes based on attention mechanism to construct a graph neural network model" may encompass various appropriate attention mechanisms. In one example, performing computation on vectorized representation of the one or more attributes based on attention mechanism to construct a graph neural network model includes performing self-attention on the individual entity, during which the flag bit is converted into a fused flag bit by fusing the individual entity's own attributes. In another example, performing computation on vectorized representation of the one or more attributes based on attention mechanism to construct a graph neural network model includes performing attention on a triple comprising the individual entity, an adjacent entity, and a respective relationship between the individual entity and the adjacent entity.

In some embodiments, the computer-implemented method further includes constructing an attribute graph comprising one or more attributes. Optionally, the step of obtaining the one or more attributes of one or more entities includes obtaining the one or more attributes of one or more entities from the attribute graph. Optionally, a distribution of the vectors conforms to a structural representation of an attribute graph.

An attribute of an entity (e.g., an attribute in an attribute graph) generally represents a certain characteristics of the entity in a particular dimension. Attributes may be of a numeric type or a semantic type.

In some embodiments, attribute values of the numeric type and attribute values of the semantic type are encoded in different manner.

In some embodiments, vectorization of an attribute of the numeric type includes randomly initializing a d-dimensional unit vector, wherein the d-dimensional unit vector follows a Gaussian distribution. The d-dimensional unit vector is denoted as a basis vector $E_d$. The basis vector $E_d$ is expressed as $E_d=[e_1, e_2, \ldots, e_d]$, wherein $e_1, e_2, \ldots, e_d$ stand for a unit vector in d number of dimensions.

A respective attribute of the numeric type is denoted as $x_i$. The vectorized representation on the attribute of the numeric type is expressed as $e_{NE}=[x_i \cdot e_1, x_i \cdot e_2, \ldots, x_i \cdot e_d]$.

In some embodiments, vectorization of attribute values of the semantic type includes initialization encoding using a self-attention model. Examples of appropriate self-attention models for initialization encoding include a Bert pre-training model and a Transformer encoder. Bert is a linguistic representation pre-training model and is capable of representing semantic information well. Bert is essentially a stacked combination of multiple Transformer encoders, either by first separating the input sentences by word and preceding them with a flag bit [CLS] to indicate the start of the sentence. As the dimensionality of the vector obtained via the BERT model is usually 768 dimensions, the computational burden in the subsequent steps is very high. The initialization encoding may also be performed using word2vec algorithm or one-hot algorithm.

In some embodiments, the method includes inputting an input data of m dimensions; encoding the input data and converting the input data into an encoded data of n dimensions; m and n are positive integers, n<m. Optionally, the input data is the vectorized representation of attribute values generated by Bert. Optionally, n is a positive integer equal to or less than 32, e.g., 32, 30, 28, 26, 24, 22, 20, 18, 16, 14, 12, 10, or 8.

Figure 3:
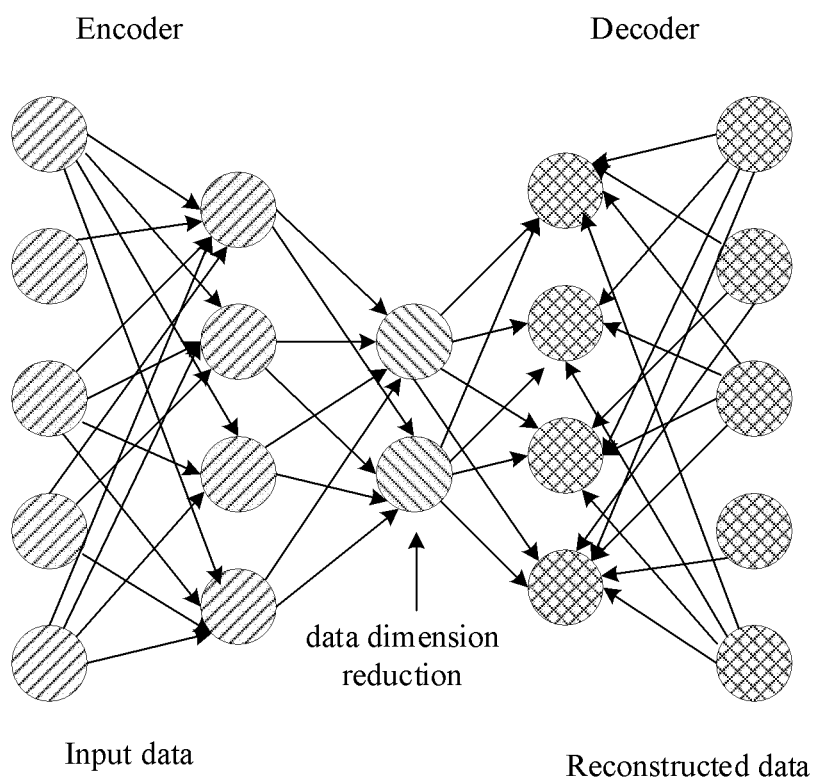
FIG. 3 illustrate an autoencoder network in some embodiments according to the present disclosure.

In some embodiments, an autoencoder is used for reducing the number of dimensions in the vector. FIG. 3 illustrate an autoencoder network in some embodiments according to the present disclosure. Referring to FIG. 3, the autoencoder includes an encoder part configured to receive an input data, and encode the input data. The dimension of the input data is reduced by the encoder to n, wherein n is a number of neurons in a middle layer of the autoencoder. In some embodiments, the encoded data may be reconstructed into a reconstructed data by a decoder part.

In some embodiments, the autoencoder has a symmetric network structure including a first network structure 10, a second network structure 20, and a third network structure 30. The first network structure 10 is configured to receive the input data, and is configured to down-sample the input data using a function f to obtain a hidden layer h, as follows:

$$h = f(x);$$

$$f(x) = \sigma\left(\sum_k \omega_{jk}^l x_k^{l-1} + b_j^l\right);$$

wherein x stands for the input data, l stands for a l-th layer of the first network structure 10, k stands for a k-th neuron, and j stands for a j-th neuron of the l-th layer.

The second network structure 20 is configured to receive the hidden layer h as an input, and is configured to reconstruct the hidden layer h using a function g to obtain an output y, as follows:

$$y = g(h) = g(f(x)).$$

In some embodiments, the autoencoder is trained by a cross-entropy loss function according to $$L(x, y) = -\sum_{i=1}^{d_x} x_i \log(y_i) + (1 - x_i)\log(1 - y_i);$$

wherein x stands for the input data input to the first network structure 10, y stands for the output from the second network structure 20. Optionally, training the autoencoder includes minimizing a difference between values of x and y.

In some embodiments, the method further includes constructing a graph neural network model based on attention mechanism. In performing the vectorized representation on the attributes, the respective attribute is encoded as a vector of d dimensions. In some embodiments, a vectorized representation of an individual entity v includes vectorized representations of m number of dimensions, wherein (m−1) dimensions out of m dimensions represent (m−1) number of attributes, and one out of the m dimensions represents the flag bit $a_0$ (e.g., the flag bit $a_0$ may be in the first column). In one example, the flag bit $a_0$ is a randomly initialized flag bit. Each attribute is of d dimensions. A total number of dimensions of a vector representing the individual entity v is m×d.

In some embodiments, the m number of attributes are listed in m number of columns in the vectorized representation of the attributes. Optionally, the flag bit $a_0$ is in a first column of the m number of columns.

In some embodiments, the method includes performing self-attention on the individual entity v. Optionally, the self-attention on the individual entity v is performed according to $$V' = \text{soft max}\left(\frac{V_q \cdot V_k^T}{\sqrt{d}}\right)V_v;$$

wherein $V_q=W_q \cdot V$, $V_k=W_k \cdot V$, and $V_v=W_v \cdot V$; wherein V' stands for a vectorized representation of the individual entity v subsequent to the self-attention; V stands for a vectorized representation of the individual entity v prior to the self-attention; $W_q$, $W_k$, and $W_v$, are learnable parameters with dimensions of d*d. The parameters $W_q$, $W_k$, and $W_v$ may be updated along with updates on model parameters. By performing self-attention on the individual entity v, the flag bit $a_0$ can learn information of the individual entity v after fusion of its own attributes. The vectorized representation subsequent to the self-attention V' includes a fused flag bit $a_0'$.

Figure 4:
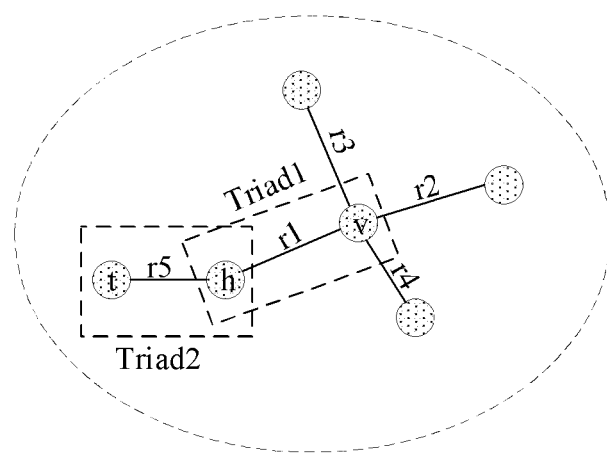
FIG. 4 illustrates an example of an attribute graph in some embodiments according to the present disclosure.

In some embodiments, the method includes performing attention on a triple comprising an individual entity v, an adjacent entity h, and a respective relationship between the individual entity v and the adjacent entity h. FIG. 4 illustrates an example of an attribute graph in some embodiments according to the present disclosure. Referring to FIG. 4, the attribute graph in some embodiments includes an individual entity v and a plurality of adjacent entities including an adjacent entity h. The attribute graph further includes a plurality of relationships among the entities, includes relationships r1 to r5. One or more triples may be obtained in the attribute graph. A respective triple includes two directly related entities and the relationship between the two directly related entities. Triple1 and Triple2 are denoted in FIG. 4 as examples of triples.

Figure 5:
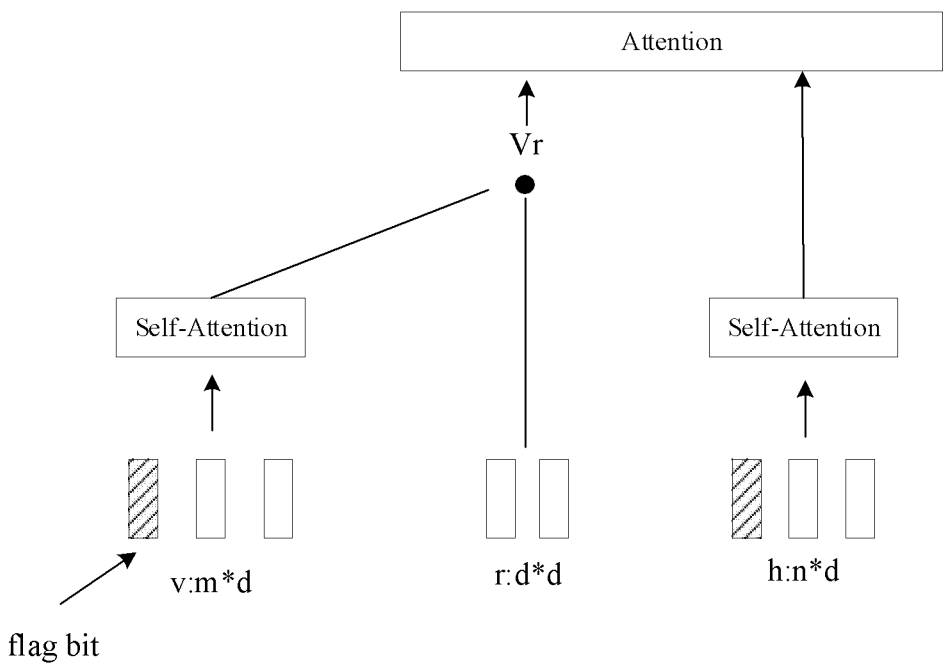
FIG. 5 depicts a step of performing attention on a triple comprising v, r, and h.

FIG. 5 depicts a step of performing attention on a triple comprising v, r, and h. Referring to FIG. 5, v stands for an individual entity, h stands for an adjacent entity, and r stands for a relationship between the individual entity and the adjacent entity. In one example, the individual entity v has a vectorized representation of m*d dimensions, the adjacent entity h has a vectorized representation of n*d dimensions, and the relationship r has a vectorized representation of d*d dimensions, wherein (m−1) dimensions out of m dimensions representing (m−1) number of attributes, and one out of the m dimensions representing the flag bit.

In some embodiments, the attention on the triple is performed according to:

$$Z = \text{soft max}\left(\frac{(V'r_1) \cdot H'^T}{\sqrt{d}}\right) \cdot H';$$

wherein Z stands for a vectorized representation subsequent to the attention on the triple, Z is of m*d dimensions; V' stands for a vectorized representation subsequent to the self-attention performed on the individual entity v; H' stands for a vectorized representation subsequent to the self-attention performed on the adjacent entity h; r1 stands for a relationship between V' and H'; and d stands for a number of dimensions of a respective attribute of the individual entity v. Optionally, Z may be understood as a vectorized representation extracting information in H' that is most relevant to V'. As discussed above, the vectorized representation subsequent to the self-attention V' includes a fused flag bit $a_0'$. Subsequent to performing the attention on the triple, the fused flag bit $a_0'$ can be further processed to learn not only information of the individual entity v after fusion of its own attributes, but also information of the adjacent entity h after fusion of the adjacent entity h's attributes. The processed flag bit may be denoted as $Z_0$.

In some embodiments, the method further includes performing neighborhood aggregate operation to aggregate information on the individual entity v and its adjacent entities. Optionally, the neighborhood aggregate operation is performed according to:

$$agg_{sum} = \sigma(W \cdot (Z_0 + Z_{S(v)}) + b);$$

wherein $\sigma$ stands for an activation function; S(v) stands for adjacent entities having a direct relationship with the individual entity v; $Z_0$ stands for a fused flag bit obtained subsequent to performing the self-attention on the individual entity; W stands for a weight; and b stands for a bias factor.

wherein $Z_{S(v)} = Z_0^1 + Z_0^2 + \ldots + Z_0^n$; wherein $Z_0^1$, $Z_0^2$, ..., $Z_0^n$ stand for processed flag bits obtained subsequent to performing the attention on triples respectively with respect to the adjacent entities having a direct relationship with the individual entity v, respectively. Specifically, each of $Z_0^1$, $Z_0^2$, ..., $Z_0^n$ is obtained by processing a respective adjacent entity through the process depicted in FIG. 5. In one example, the neighborhood aggregate operation is a fully connected layer in the graph neural network.

In some embodiments, the neighborhood aggregate operation is performed according to a weighted sum operation on adjacent entities using similarities as weights.

In some embodiments, the neighborhood aggregate operation is performed according to the weighted sum operation on one or more entities each having a direct relationship with the individual entity.

In some embodiments, the neighborhood aggregate operation is performed according to the weighted sum operation on the one or more entities each having a direct relationship with the individual entity, and on one or more entities each having an indirect relationship with the individual entity.

In one example, the neighborhood aggregate operation is performed according to the weighted sum operation on one or more first order entities each having a direct relationship with the individual entity, and on one or more second order entities. The one or more second order entities refers to entities that do not have a direct relationship with the individual entity, but each has a direct relationship with at least one of the one or more first order entities.

In another example, the neighborhood aggregate operation is performed according to the weighted sum operation on one or more first order entities each having a direct relationship with the individual entity, on one or more second order entities, and on one or more third order entities. The one or more second order entities refers to entities that do not have a direct relationship with the individual entity, but each has a direct relationship with at least one of the one or more first order entities. The one or more third order entities refers to entities that do not have a direct relationship with the individual entity, do not have a direct relationship with the one or more first order entities, but each has a direct relationship with at least one of the one or more second order entities.

In another example, the neighborhood aggregate operation is performed according to the weighted sum operation on one or more first order entities each having a direct relationship with the individual entity, and on one or more $2^{nd}$ to N-th order entities, wherein N is an integer equal to or greater than 2. An n-th order entities refers to one or more entities that do not have a direct relationship with the individual entity, do not have a direct relationship with any of $2^{nd}$ to (n−2)-th order entities, but each has a direct relationship with at least one of the (n−1)-th order entities, $2 \leq n \leq N$. Optionally, N is 2, 3, 4, 5, 6, 7, 8, 9, or 10.

As used herein, the term "adjacent entities" refers to one or more entities each having a direct or indirect relationship with the individual entity. In some embodiments, the adjacent entities include the one or more first order entities that have a direct relationship with the individual entity. In some embodiments, the adjacent entities include the one or more first order entities and the one or more second order entities. In some embodiments, the adjacent entities include the one or more first order entities, the one or more second order entities, and the one or more third order entities. In some embodiments, the adjacent entities include the one or more first order entities and the one or more $2^{nd}$ to N-th order entities.

In some embodiments, the neighborhood aggregate operation is performed according to:

$$w_i = \text{soft max}(p^T R_i h_i) = \frac{\exp(p^T R_i h_i)}{\sum_{(h,r,t) \in S'_c} \exp(p^T R h)};$$

where i is a positive integer greater than 0 and less than or equal to H, p stands for the vectorized representation of a respective item, h stands for a head entity of one or more adjacent triples, t stands for a tail entity of the one or more adjacent triples, R stands for the relationship matrix, H is a positive integer representing a number of propagations performed, a tail entity in a previous propagation being a head entity in a present propagation along the propagation path. The head entity is an entity having a direct relationship with the respective item.

In some embodiments, the first order vectorized representation is expressed as:

$$o_c^1 = \sum_{(h_1, r_1, t_1) \in S'_c} w_1 t_1;$$

In some embodiments, an i-th order vectorized representation is expressed as:

$$o_c^i = \sum_{(h_i, r_i, t_i) \in S'_c} w_i t_i;$$

In some embodiments, the vectorized representation is expressed as:

$$C = c_1 + c_2 + \cdots + c_i + \cdots + c_H;$$

wherein $c_1, c_2, \ldots, c_i, \ldots, c_H$ stand for the first order vectorized representation to an H-th order vectorized representation, respectively; $c_i = o_c^i$, i is a positive integer greater than 0 and less than or equal to H.

In some embodiments, the method further includes updating the flag bit $a_0$ in the vectorized representation of the individual entity v with a result of the neighborhood aggregate operation $\text{agg}_{sum} = \sigma(W \cdot (Z_0 + Z_{S(v)}) + b)$, thereby obtaining an updated flag bit. In a gradient back propagation in a training process of the graph neural network model, a gradient of the flag bit is used to adjust the properties of the entity.

In some embodiments, the computer-implemented method according to the present disclosure is a computer-implemented method for training an item graph neural network model configured to recommend an item to a user. Optionally, the vectorized representation of the individual entity v discussed above is a vectorized representation of a respective item. Optionally, the respective item is an item that has a relationship, direct or indirect, with a user. In one example, the respective item is an item that has been previously selected by a respective user. In another example, the respective item is an item that has been previously viewed by the respective user. In another example, the respective item is an item that has been previously selected by another user that has a relationship with the respective user. In another example, the respective item is an item that has been previously viewed by another user that has a relationship with the respective user.

Various appropriate items may be recommended by the present method. In one example, the items include tangible items such as clothes, food, vehicles, and electronic products. In another example, the items include intangible items such as audio and video files, patents, trademarks, publications, and news.

In some embodiments, the computer-implemented method further includes obtaining a product of a vectorized representation of a respective user and the updated vectorized representation V" of the individual entity v. In the updated vectorized representation V" of the individual entity v, the flag bit is updated with the result of the neighborhood aggregate operation $\text{agg}_{sum} = \sigma(W \cdot (Z_0 + Z_{S(v)}) + b)$. The operation may be expressed as $\hat{y}_{uv} = ru \cdot V"$, wherein ru stands for a vectorized representation of a respective user, and V" stands for the updated vectorized representation of the individual entity v. In one example, the vectorized representation ru of a respective user may be a randomly initialized vector of d dimensions. Optionally, the product of the vectorized representation of the respective user and the updated vectorized representation V" of the individual entity v may be understood as a representation of a user's preference probabilities for item(s).

In some embodiments, the computer-implemented method further includes training the graph neural network model using a loss function. Optionally, the loss function is expressed as:

$$L = \sum_{u \in U} \left( \sum_{v: y_{uv}=1} C(y_{uv}, \hat{y}_{uv}) - \sum_{v: y_{uv}=0}^{T^u} C(y_{uv}, \hat{y}_{uv}) \right) + \lambda \|\varepsilon\|_2^2;$$

wherein C stands for a cross-entropy loss, $\lambda \|\varepsilon\|$ denotes a L2 regularization of parameters of the graph neural network model; $y_{uv}$ stands for a true label of a sample; $\hat{y}_{uv}$ stands for an output of the graph neural network model; $T^u$ stands for a number of negative samples. Accordingly, a middle term of the function stands for a cross-entropy loss of negative samples. A unique advantage of the above cross-entropy loss function is that it allows excellent predictions of both positive and negative samples. In one example, when a label of a negative sample is 0, the prediction output for the negative sample is also 0 or closer to 0. A last term of the function denotes a L2 regularization of parameters of the graph neural network model, thereby preventing overfitting. The last term may be understood as a weight of the L2 regularization in the cross-entropy loss.

In some embodiments, the cross-entropy loss is expressed as:

$$C(y_{uv}, \hat{y}_{uv}) = -(y_{uv}\log(\text{sigmoid}(\hat{y}_{uv})) + (1 - y_{uv})\log(\text{sigmoid}(1 - \hat{y}_{uv}))).$$

In another aspect, the present disclosure provides a method of item recommendation. In some embodiments, the method includes receiving a request for item recommendation from a user; obtaining the user's preference probabilities for items based on the graph neural network model constructed according to the method described above; and outputting a list of item recommendations based on the preference probabilities. Optionally, the step of receiving the request for item recommendation is performed prior to the step of obtaining the user's preference probabilities. Optionally, the step of obtaining the user's preference probabilities is performed prior to the step of receiving the request for item recommendation. Optionally, the step of obtaining the user's preference probabilities and the step of receiving the request for item recommendation may be performed simultaneously. Optionally, the request for item recommendation is automatically generated by a user triggering a specific event in the item recommendation system. For example, the specific event can be a user browsing a page for more than a predetermined length of time, or it can be the act of a user making a purchase, or it can be the act of a user querying an item.

In some embodiments, the user's preference probabilities can be obtained based on a graph neural network model trained on the user's historical item retrieval information. Optionally, the method includes pre-storing the user's historical item retrieval information and training the graph neural network model based on the user's historical item retrieval information thereby obtaining the user's preference probabilities for an item. In one example, the item is a historical item associated with the user's historical item retrieval information. In another example, the item is an item other than a historical item.

In some embodiments, subsequent to receiving the request for item recommendation, the method further includes assigning a user id for uniquely identifying the user. Optionally, subsequent to obtaining the user's preference probabilities, the method further includes storing a correspondence between the user id and a preference probability for the item. Optionally, the method further includes determining the preference probability of the user id for a corresponding item based on the correspondence, thereby enabling targeted item recommendation based on the user's preference probability.

As discussed above, the vectorized representations in the graph neural network model constructed according to the present disclosure contain information of the individual entity (e.g., a respective item) by fusing its own attributes, as well as information of the adjacent entities (e.g., adjacent items) by fusing the adjacent entities' attributes. The method of item recommendation according to the present disclosure has an enhanced capability of accurately calculating the user's preference probabilities.

In some embodiments, subsequent to obtaining the user's preference probabilities, the method further includes outputting a list of item recommendations based on the preference probabilities. The user's preference probabilities are used to characterize whether the user is interested in the items, and the list of item recommendations includes one item or more items.

In some embodiments, the method of item recommendation can be applied to a dichotomous task, and accordingly, the preference probability can be "0", or "1". For example, a probability of greater than 0.5 equates to a preference probability of "1", indicating that the user is interested in the item. In another example, a probability of less than or equal to 0.5 equates to a preference probability of "0", indicating that the user is not interested in the item.

In some embodiments, the method of item recommendation can be applied to a fitting task, during which the preference probability corresponds to a specific probability value. In one example, the item recommendation list of items of interest to the user is filtered according to a ranking based on specific probability values, thus realizing the item recommendation to the user.

The method of item recommendation may be implemented in various scenarios. In one example, the method of item recommendation automatically pushes videos B and C of interest to the user while the user is watching video A. In another example, the method of item recommendation automatically pushes a public account of interest to the user. In another example, if the user enters the name of the item to be retrieved, "mug", the item recommendation system will recommend all types of mugs of interest to the user, such as glass mugs, ceramic mugs, thermal mugs, etc., according to the user's interest level.

In some embodiments, obtaining the user's preference probabilities for items based on the graph neural network model includes performing neighborhood aggregate operation to aggregate information on the individual entity and its adjacent entities. Various appropriate implementations may be practiced in the present disclosure.

In some embodiments, the neighborhood aggregate operation is performed according to a weighted sum operation on adjacent entities of one or more adjacent triples using similarities as weights. In some embodiments, obtaining the user's preference probabilities for items based on the graph neural network model includes determining similarities in relationship space between a respective item of the items and head entities of one or more adjacent triples, respectively, a respective head entity of the head entities being an entity having a direct relationship with the respective item; obtaining a first order vectorized representation for the user by performing a weighted sum operation on tail entities of the one or more adjacent triples using the similarities as weights, respectively, thereby completing a first propagation; reiterating the determining and obtaining process for (H−1) number of times along a propagation path in the graph neural network model, thereby completing H number of propagations, H being a positive integer, a tail entity in a previous propagation being a head entity in a present propagation along the propagation path; and obtaining a product of a vectorized representation for the user and a vectorized representation of the respective item, thereby obtaining the user's preference probability with respect to the respective item.

In some embodiments, the neighborhood aggregate operation is performed according to $agg_{sum}=\sigma(W \cdot (Z_0+Z_{S(v)})+b)$, as discussed above. Optionally, the vectorized representation of the respective item is an updated vectorized representation of the respective item subsequent to updating the flag bit $a_0$ in the vectorized representation of the respective item with a result of the neighborhood aggregate operation $agg_{sum}=\sigma(W \cdot (Z_0+Z_{S(v)})+b)$, as discussed previously.

In some embodiments, determining similarities in relationship space between a respective item of the items and head entities of one or more adjacent triples is performed according to:

$$w_i = \text{soft max}(p^T R_i h_i) = \frac{\exp(p^T R_i h_i)}{\sum_{(h,r,t) \in S'_c} \exp(p^T R h)};$$

where i is a positive integer greater than 0 and less than or equal to H, p stands for the vectorized representation of the respective item, h stands for the head entity, t stands for the tail entity, and R stands for the relationship matrix.

In some embodiments, the first order vectorized representation for the user is expressed as:

$$o_c^1 = \sum_{(h_1,r_1,t_1)\in S'_c} w_1 t_1;$$

In some embodiments, an i-th order vectorized representation for the user is expressed as:

$$o_c^i = \sum_{(h_i,r_i,t_i)\in S'_c} w_i t_i;$$

In some embodiments, the vectorized representation for the user is expressed as:

$$C = c_1 + c_2 + \ldots + c_i + \ldots + c_H;$$

wherein $c_1, c_2, \ldots, c_i, \ldots, c_H$ stand for the first order vectorized representation for the user to an H-th order vectorized representation for the user, respectively; $c_i = o_c^i$, i is a positive integer greater than 0 and less than or equal to H.

In some embodiments, the method of item recommendation is applied to a dichotomous task. Optionally, the user's preference probabilities is expressed as:

$$\hat{y}_{cp} = \sigma(C^T p);$$

wherein a stands for an activation function.

In some embodiments, the method of item recommendation is applied to a fitting task. Optionally, the user's preference probabilities is expressed as:

$$\hat{y}_{cp} = (C^T \cdot W_C + b_C) \cdot p;$$

wherein $W_C$ stands for a weighing factor and $b_C$ stands for a bias factor.

In some embodiments, the first order vectorized representation for the user may further be obtained based on a relationship capture network. By using a relationship capture network, the first order vectorized representation for the user may learn information about edge relationships between the respective item and the head entities of one or more adjacent triples.

In some embodiments, the relationship capture network is expressed as:

$$c_i = o_c^i + o_c^i \cdot r';$$

where i is a positive integer greater than 0 and less than or equal to H, of stands for an i-th order vectorized representation for the user, and r stands for a relationship vector. Optionally, the i-th order vectorized representation for the user is obtained by performing a weighted sum operation on tail entities of adjacent triples in an i-th propagation using similarities as weights, respectively, the similarities being similarities in relationship space between the respective item and head entities of adjacent triples in the i-th propagation, respectively.

In some embodiments, the relationship capture network is a residual structure. In one example, the relationship vector r is a relationship between the respective item and the head entity. In another example, the relationship vector r is a relationship between adjacent triples. In another example, the relationship vector r is a weighted sum of the relationship between the respective item and the head entity and the relationship between adjacent triples.

In some embodiments, the relationship vector r is expressed as $r'=W_R \cdot R+b_R$, wherein R stands for a relationship matrix, $W_R$ stands for a dimensionality reduction matrix, and $b_R$ stands for a bias factor. Accordingly, dimensionality reduction of the relationship matrix R can be achieved.

Figure 6:
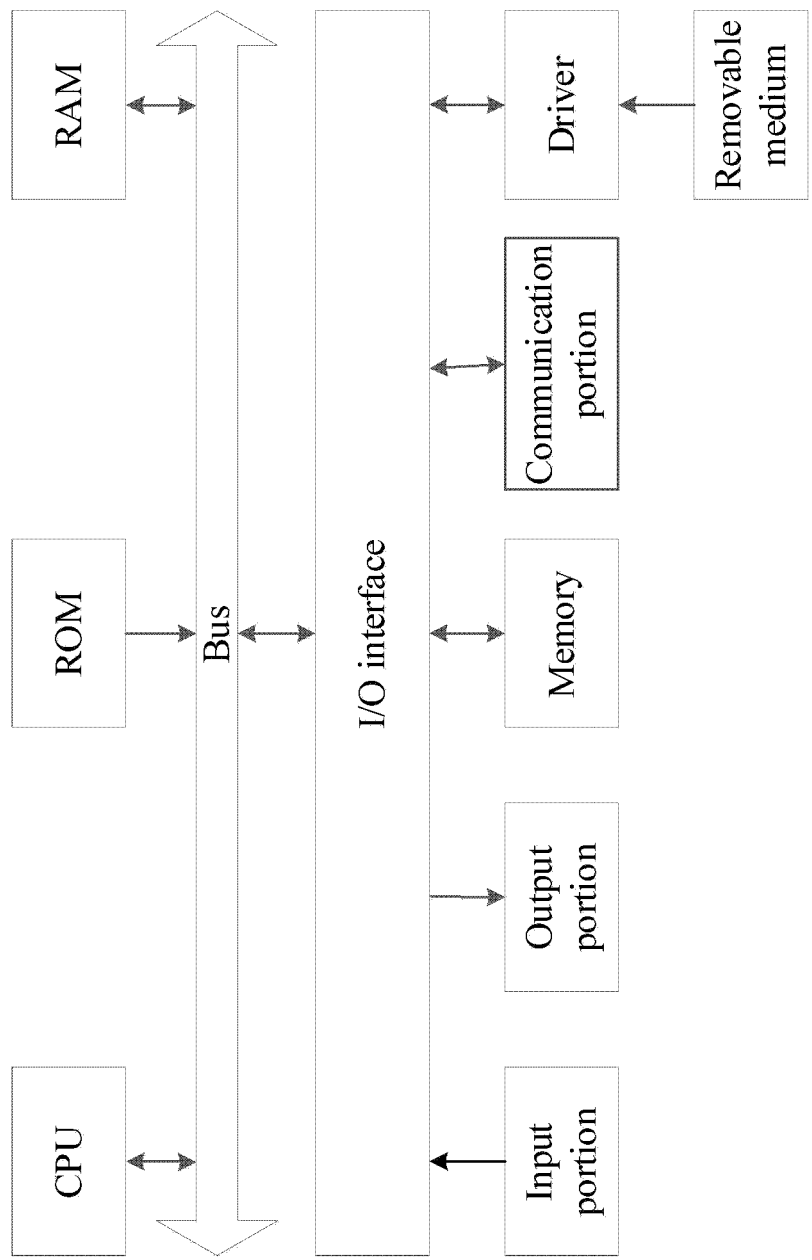
FIG. 6 is a schematic diagram of a structure of an apparatus in some embodiments according to the present disclosure.

In another aspect, the present disclosure provides an apparatus. FIG. 6 is a schematic diagram of a structure of an apparatus in some embodiments according to the present disclosure. Referring to FIG. 6, in some embodiments, the apparatus includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

In some embodiments, the apparatus includes a memory, and one or more processors, wherein the memory and the one or more processors are connected with each other. In some embodiments, the memory stores computer-executable instructions for controlling the one or more processors to obtain one or more attributes of one or more entities; perform a vectorized representation on a respective attribute of the one or more attributes, the vectorized representation being encoded as a vector of d dimensions; and perform computation on vectorized representation of the one or more attributes based on attention mechanism to construct a graph neural network model. Optionally, vectors of m number of dimensions are used to represent an individual entity in the graph neural network model. Optionally, (m−1) dimensions out of m dimensions represent (m−1) number of attributes, and one out of the m dimensions represents a flag bit. Optionally, in constructing the graph neural network model, the memory stores computer-executable instructions for controlling the one or more processors to perform self-attention on the individual entity, during which the flag bit is converted into a fused flag bit by fusing the individual entity's own attributes.

In some embodiments, the memory stores computer-executable instructions for controlling the one or more processors to construct an attribute graph comprising one or more attributes. Optionally, the one or more attributes of the one or more entities may be obtained from the attribute graph.

In some embodiments, a total number of dimensions of a vector representing the individual entity is m×d. Optionally, the memory further stores computer-executable instructions for controlling the one or more processors to perform the self-attention on the individual entity according to $$V' = \text{softmax}\left(\frac{V_q \cdot V_k^T}{\sqrt{d}}\right) V_v;$$

wherein V' stands for a vectorized representation of the individual entity subsequent to the self-attention; the vectorized representation subsequent to the self-attention comprises the fused flag bit; $V_q=W_q \cdot V$, $V_k=W_k \cdot V$, and $V_v=W_v \cdot V$; V stands for a vectorized representation of the individual entity prior to the self-attention; and $W_q$, $W_k$, and $W_v$, are learnable parameters with dimensions of d*d.

In some embodiments, the memory further stores computer-executable instructions for controlling the one or more processors to perform attention on a triple comprising the individual entity, an adjacent entity, and a respective relationship between the individual entity and the adjacent entity.

In some embodiments, the memory further stores computer-executable instructions for controlling the one or more processors to perform the attention on the triple according to $$Z = \text{softmax}\left(\frac{(V'r_1) \cdot H'^T}{\sqrt{d}}\right) \cdot H';$$

wherein Z stands for a vectorized representation subsequent to the attention on the triple; Z is of m*d dimensions; V' stands for a vectorized representation subsequent to the self-attention performed on the individual entity; H' stands for a vectorized representation subsequent to a self-attention performed on the adjacent entity; r1 stands for a relationship between V and H'; and d stands for a number of dimensions of the respective attribute. Optionally, Z may be understood as a parameter establishing an association relationship between V' and H', in preparation for subsequent neighborhood aggregate operation.

In some embodiments, the vectorized representation V subsequent to the self-attention performed on the individual entity comprises the fused flag bit. Optionally, during the attention performed on the triple, the memory further stores computer-executable instructions for controlling the one or more processors to process the fused flag bit into a processed flag bit by fusing the individual entity's own attributes and the adjacent entity's attributes.

In some embodiments, the individual entity has a vectorized representation of m*d dimensions; the adjacent entity has a vectorized representation of n*d dimensions; and the relationship has a vectorized representation of d*d dimensions, wherein (m−1) dimensions out of m dimensions representing (m−1) number of attributes, and one out of the m dimensions representing the flag bit.

In some embodiments, the memory further stores computer-executable instructions for controlling the one or more processors to perform neighborhood aggregate operation to aggregate information on the individual entity and its adjacent entities.

In some embodiments, the memory further stores computer-executable instructions for controlling the one or more processors to perform the neighborhood aggregate operation according to $\text{agg}_{sum}=\sigma(W \cdot (Z_0+Z_{S(v)})+b)$; wherein σ stands for an activation function; S(v) stands for adjacent entities having a direct relationship with the individual entity; $Z_0$ stands for a fused flag bit obtained subsequent to performing the self-attention on the individual entity; W stands for a weight; b stands for a bias factor; $Z_{S(v)}=Z_0^1+Z_0^2+\ldots+Z_0^n$; and $Z_0^1, Z_0^2, \ldots, Z_0^n$ stand for processed flag bits obtained subsequent to performing attention on triples respectively with respect to adjacent entities having a direct relationship with the individual entity, respectively.

In some embodiments, the memory further stores computer-executable instructions for controlling the one or more processors to update the flag bit in the vectorized representation of the individual entity with a result of the neighborhood aggregate operation $\text{agg}_{sum}=\sigma(W \cdot (Z_0+Z_{S(v)})+b)$, thereby obtaining an updated vectorized representation of the individual entity.

In some embodiments, the memory further stores computer-executable instructions for controlling the one or more processors to perform a vectorized representation on an attribute of a numeric type. Optionally, the memory further stores computer-executable instructions for controlling the one or more processors to randomly initialize a d-dimensional unit vector, wherein the d-dimensional unit vector follows a Gaussian distribution. Optionally, the d-dimensional unit vector is denoted as a basis vector $E_d$; the basis vector $E_d$ is expressed as $E_d=[e_1, e_2, \ldots, e_d]$, wherein $e_1, e_2, \ldots, e_d$ stand for a unit vector in d number of dimensions; a respective attribute of the numeric type is denoted as $x_i$; and the vectorized representation on the attribute of the numeric type is expressed as $e_{NE}=[x_i \cdot e_1, x_i \cdot e_2, \ldots, x_i \cdot e_d]$.

In some embodiments, the memory further stores computer-executable instructions for controlling the one or more processors to obtain a product of a vectorized representation of a respective user and an updated vectorized representation of the individual entity. In the updated vectorized representation of the individual entity, the flag bit is updated with a result of a neighborhood aggregate operation. Optionally, the product of the vectorized representation of the respective user and the updated vectorized representation of the individual entity is expressed as $\hat{y}_{uv}=ru \cdot V''$. Optionally, ru stands for the vectorized representation of the respective user; and V'' stands for the updated vectorized representation of the individual entity. Optionally, the product of the vectorized representation of the respective user and the updated vectorized representation of the individual entity may be understood as a representation of a user's preference probabilities for item(s).

In some embodiments, the memory further stores computer-executable instructions for controlling the one or more processors to train the graph neural network model using a loss function expressed as $L=\Sigma_{u \in U}(\Sigma_{v:y_{uv}=1} C(y_{uv}, \hat{y}_{uv}) - \Sigma_{v:y_{uv}=0}^{T^u} C(y_{uv}, \hat{y}_{uv})) + \lambda \|\varepsilon\|_2^2$; wherein C stands for a cross-entropy loss; $\lambda \|\varepsilon\|_2^2$ denotes a L2 regularization of parameters of the graph neural network model; $y_{uv}$ stands for a true label of a sample; $y_{uv}$ stands for an output of the graph neural network model; and $T^u$ stands for a number of negative samples. Accordingly, a middle term of the function stands for a cross-entropy loss of negative samples. A unique advantage of the above cross-entropy loss function is that it allows excellent predictions of both positive and negative samples. In one example, when a label of a negative sample is 0, the prediction output for the negative sample is also 0 or closer to 0. A last term of the function denotes a L2 regularization of parameters of the graph neural network model, thereby preventing overfitting. The last term may be understood as a weight of the L2 regularization in the cross-entropy loss.

In some embodiments, the cross-entropy loss is expressed as:

$$C(y_{uv}, \hat{y}_{uv}) = -(y_{uv} \log(\text{sigmoid}(\hat{y}_{uv})) + (1-y_{uv}) \log(\text{sigmoid}(1-\hat{y}_{uv}))).$$

In some embodiments, the graph neural network is an item graph neural network model configured to recommend an item to a user; the vectorized representation of the individual entity is a vectorized representation of a respective item; and the respective item is an item that has a relationship, direct or indirect, with the user.

In another aspect, the present disclosure provides a computer-program product including a non-transitory tangible computer-readable medium having computer-readable instructions thereon. In some embodiments, the computer-readable instructions being executable by a processor to cause the processor to perform obtaining one or more attributes of one or more entities; performing a vectorized representation on a respective attribute of the one or more attributes, the vectorized representation being encoded as a vector of d dimensions; and performing computation on vectorized representation of the one or more attributes based on attention mechanism to construct a graph neural network model. Optionally, vectors of m number of dimensions are used to represent an individual entity in the graph neural network model. Optionally, (m−1) dimensions out of m dimensions represent (m−1) number of attributes, and one out of the m dimensions represents a flag bit. Optionally, in constructing the graph neural network model, the memory stores computer-executable instructions for controlling the one or more processors to perform self-attention on the individual entity, during which the flag bit is converted into a fused flag bit by fusing the individual entity's own attributes.

In some embodiments, the computer-readable instructions is executable by a processor to cause the processor to perform constructing an attribute graph comprising one or more attributes. Optionally, the step of obtaining the one or more attributes of one or more entities includes obtaining the one or more attributes of one or more entities from the attribute graph.

In some embodiments, a total number of dimensions of a vector representing the individual entity is m×d. In some embodiments, the computer-readable instructions are executable by a processor to cause the processor to further perform the self-attention on the individual entity according to $$V' = \text{softmax}\left(\frac{V_q \cdot V_k^T}{\sqrt{d}}\right)V_v;$$

wherein V' stands for a vectorized representation of the individual entity subsequent to the self-attention; the vectorized representation subsequent to the self-attention comprises the fused flag bit; $V_q = W_q \cdot V$, $V_k = W_k \cdot V$, and $V_v = W_v \cdot V$; V stands for a vectorized representation of the individual entity prior to the self-attention; and $W_q$, $W_k$, and $W_v$, are learnable parameters with dimensions of d*d.

In some embodiments, the computer-readable instructions are executable by a processor to cause the processor to further perform attention on a triple comprising the individual entity, an adjacent entity, and a respective relationship between the individual entity and the adjacent entity.

In some embodiments, the computer-readable instructions are executable by a processor to cause the processor to further perform the attention on the triple according to $$Z = \text{softmax}\left(\frac{(V' r_1) \cdot H'^T}{\sqrt{d}}\right) \cdot H';$$

wherein Z stands for a vectorized representation subsequent to the attention on the triple; Z is of m*d dimensions; V' stands for a vectorized representation subsequent to the self-attention performed on the individual entity; H' stands for a vectorized representation subsequent to a self-attention performed on the adjacent entity; r1 stands for a relationship between V' and H'; and d stands for a number of dimensions of the respective attribute. Optionally, Z may be understood as a parameter establishing an association relationship between V' and H', in preparation for subsequent neighborhood aggregate operation.

In some embodiments, the vectorized representation V' subsequent to the self-attention performed on the individual entity comprises the fused flag bit. Optionally, the computer-readable instructions are executable by a processor to cause the processor to further perform, during the attention performed on the triple, processing the fused flag bit into a processed flag bit by fusing the individual entity's own attributes and the adjacent entity's attributes.

In some embodiments, the individual entity has a vectorized representation of m*d dimensions; the adjacent entity has a vectorized representation of n*d dimensions; and the relationship has a vectorized representation of d*d dimensions, wherein (m−1) dimensions out of m dimensions representing (m−1) number of attributes, and one out of the m dimensions representing the flag bit.

In some embodiments, the computer-readable instructions are executable by a processor to cause the processor to further perform neighborhood aggregate operation to aggregate information on the individual entity and its adjacent entities.

In some embodiments, the computer-readable instructions are executable by a processor to cause the processor to further perform the neighborhood aggregate operation according to $\text{agg}_{sum} = \sigma(W \cdot (Z_0 + Z_{S(v)}) + b)$; wherein a stands for an activation function; S(v) stands for adjacent entities having a direct relationship with the individual entity; $Z_0$ stands for a fused flag bit obtained subsequent to performing the self-attention on the individual entity; W stands for a weight; b stands for a bias factor; $Z_{S(v)} = Z_0^1 + Z_0^2 + \ldots + Z_0^n$; and $Z_0^1, Z_0^2, \ldots, Z_0^n$ stand for processed flag bits obtained subsequent to performing attention on triples respectively with respect to the adjacent entities having a direct relationship with the individual entity, respectively.

In some embodiments, the computer-readable instructions are executable by a processor to cause the processor to further perform updating the flag bit in the vectorized representation of the individual entity with a result of the neighborhood aggregate operation $\text{agg}_{sum} = \sigma(W \cdot (Z_0 + Z_{S(v)}) + b)$, thereby obtaining an updated vectorized representation of the individual entity.

In some embodiments, the computer-readable instructions are executable by a processor to cause the processor to further perform a vectorized representation on an attribute of a numeric type.

In some embodiments, the computer-readable instructions are executable by a processor to cause the processor to further perform randomly initializing a d-dimensional unit vector, wherein the d-dimensional unit vector follows a Gaussian distribution. Optionally, the d-dimensional unit vector is denoted as a basis vector $E_d$; the basis vector $E_d$ is expressed as $E_d = [e_1, e_2, \ldots, e_d]$, wherein $e_1, e_2, \ldots, e_d$ stand for a unit vector in d number of dimensions; a respective attribute of the numeric type is denoted as $x_i$; and the vectorized representation on the attribute of the numeric type is expressed as $e_{NE} = [x_i \cdot e_1, x_i \cdot e_2, \ldots, x_i \cdot e_d]$.

In some embodiments, the computer-readable instructions are executable by a processor to cause the processor to further perform obtaining a product of a vectorized representation of a respective user and an updated vectorized representation of the individual entity. In the updated vectorized representation of the individual entity, the flag bit is updated with a result of a neighborhood aggregate operation. Optionally, the product of the vectorized representation of the respective user and the updated vectorized representation of the individual entity is expressed as $\hat{y}_{uv} = ru \cdot V''$. Optionally, ru stands for the vectorized representation of the respective user; and V'' stands for the updated vectorized representation of the individual entity. Optionally, the product of the vectorized representation of the respective user and the updated vectorized representation of the individual entity may be understood as a representation of a user's preference probabilities for item(s).

In some embodiments, the computer-readable instructions are executable by a processor to cause the processor to further perform training the graph neural network model using a loss function expressed as $L = \Sigma_{u \in U}(\Sigma_{v:y_{uv}=1} C(y_{uv}, \hat{y}_{uv}) - \Sigma_{v:y_{uv}=0}^{T^u} C(y_{uv}, \hat{y}_{uv})) + \mu \|\in\|_2^2$; wherein C stands for a cross-entropy loss; $\lambda \|\in\|_2^2$ denotes a L2 regularization of parameters of the graph neural network model; $y_{uv}$ stands for a true label of a sample; $\hat{y}_{uv}$ stands for an output of the graph neural network model; and $T^u$ stands for a number of negative samples. Accordingly, a middle term of the function stands for a cross-entropy loss of negative samples. A unique advantage of the above cross-entropy loss function is that it allows excellent predictions of both positive and negative samples. In one example, when a label of a negative sample is 0, the prediction output for the negative sample is also 0 or closer to 0. A last term of the function denotes a L2 regularization of parameters of the graph neural network model, thereby preventing overfitting. The last term may be understood as a weight of the L2 regularization in the cross-entropy loss.

In some embodiments, the cross-entropy loss is expressed as:

$$C(y_{uv}, \hat{y}_{uv}) = -(y_{uv} \log(\text{sigmoid}(\hat{y}_{uv})) + (1 - y_{uv}) \log(\text{sigmoid}(1 - \hat{y}_{uv}))).$$

In some embodiments, the graph neural network is an item graph neural network model configured to recommend an item to a user; the vectorized representation of the individual entity is a vectorized representation of a respective item; and the respective item is an item that has a relationship, direct or indirect, with the user.

In another aspect, the present disclosure provides an apparatus for item recommendation. In some embodiments, the apparatus for item recommendation includes a memory, and one or more processors, wherein the memory and the one or more processors are connected with each other. In some embodiments, the memory stores computer-executable instructions for controlling the one or more processors to receive a request for item recommendation from a user; obtain the user's preference probabilities for items based on the graph neural network model constructed according to the computer-implemented method described herein; and output a list of item recommendations based on the preference probabilities.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, comprising:
    obtaining one or more attributes of one or more entities;
    performing a vectorized representation on a respective attribute of the one or more attributes, the vectorized representation being encoded as a vector of d dimensions; and
    performing computation on vectorized representation of the one or more attributes based on attention mechanism to construct a graph neural network model;
    wherein vectors of m number of dimensions are used to represent an individual entity in the graph neural network model, (m−1) dimensions out of m dimensions represent (m−1) number of attributes, and one out of the m dimensions represents a flag bit;
    wherein constructing the graph neural network model comprises performing self-attention on the individual entity, during which the flag bit is converted into a fused flag bit by fusing the individual entity's own attributes;
    updating the fused flag bit during training of the graph neural network model so that the fused flag bit reflects changes in the entity's attributes;
    applying the constructed graph neural network model including the fused flag bit in an item recommendation task to determine preference probabilities for items and to generate recommendation results; and
    outputting, based on the preference probabilities, a ranked list of items for presentation to a user.

2. The computer-implemented method of claim 1, wherein constructing the graph neural network model further comprises performing neighborhood aggregate operation to aggregate information on the individual entity and adjacent entities.

3. The computer-implemented method of claim 1, wherein a total number of dimensions of a vector representing the individual entity is m×d;

wherein the self-attention on the individual entity is performed according to $$V' = \text{softmax}\left(\frac{V_q \cdot V_k^T}{\sqrt{d}}\right)V_v;$$

wherein V' stands for a vectorized representation of the individual entity subsequent to the self-attention;
the vectorized representation subsequent to the self-attention comprises the fused flag bit;

$$V_q = W_q \cdot V, V_k = W_k \cdot V, \text{ and } V_v = W_v \cdot V;$$

V stands for a vectorized representation of the individual entity prior to the self-attention; and
$W_q$, $W_k$, and $W_v$, are learnable parameters with dimensions of d*d.

4. The computer-implemented method of claim 1, wherein constructing the graph neural network model further comprises performing attention on a triple comprising the individual entity, an adjacent entity, and a respective relationship between the individual entity and the adjacent entity.

5. The computer-implemented method of claim 4, wherein the attention on the triple is performed according to:

$$Z = \text{softmax}\left(\frac{(V' r_1) \cdot H'^T}{\sqrt{d}}\right) \cdot H';$$

wherein Z stands for a vectorized representation subsequent to the attention on the triple;
Z is of m*d dimensions;
V stands for a vectorized representation subsequent to the self-attention performed on the individual entity;
H' stands for a vectorized representation subsequent to a self-attention performed on the adjacent entity;
r1 stands for a relationship between V' and H'; and
d stands for a number of dimensions of the respective attribute.

6. The computer-implemented method of claim 5, wherein the vectorized representation V subsequent to the self-attention performed on the individual entity comprises the fused flag bit; and
during the attention performed on the triple, the fused flag bit is processed into a processed flag bit by fusing the individual entity's own attributes and the adjacent entity's attributes.

7. The computer-implemented method of claim 4, wherein the individual entity has a vectorized representation of m*d dimensions;
the adjacent entity has a vectorized representation of n*d dimensions; and
the relationship has a vectorized representation of d*d dimensions.

8. The computer-implemented method of claim 2, wherein the neighborhood aggregate operation is performed according to:
$\text{agg}_{sum} = \sigma(W \cdot (Z_0 + Z_{s(v)}) + b)$;
wherein σ stands for an activation function;
$Z_0$ stands for a fused flag bit obtained subsequent to performing the self-attention on the individual entity;

W stands for a weight;
b stands for a bias factor;
$Z_{s(v)} = Z_0^1 + Z_0^2 + \ldots + Z_0^n$; and
$Z_0^1, Z_0^2, \ldots, Z_0^n$ stand for processed flag bits obtained subsequent to performing attention on triples respectively with respect to the adjacent entities that have a direct relationship with the individual entity, respectively.

9. The computer-implemented method of claim 8, wherein constructing the graph neural network model further comprises:
updating the flag bit in the vectorized representation of the individual entity with a result of the neighborhood aggregate operation $\text{agg}_{sum} = \sigma(W \cdot (Z_0 + Z_{s(v)}) + b)$, thereby obtaining an updated flag bit.

10. The computer-implemented method of claim 2, wherein the neighborhood aggregate operation is performed according to a weighted sum operation on the adjacent entities using similarities as weights.

11. The computer-implemented method of claim 1, wherein performing the vectorized representation on a respective attribute comprises performing a vectorized representation on an attribute of a numeric type.

12. The computer-implemented method of claim 11, wherein performing the vectorized representation on the attribute of the numeric type comprises:
randomly initializing a d-dimensional unit vector, wherein the d-dimensional unit vector follows a Gaussian distribution;
wherein the d-dimensional unit vector is denoted as a basis vector $E_d$;
the basis vector $E_d$ is expressed as $E_d = [e_1, e_2, \ldots, e_d]$, wherein $e_1, e_2, \ldots, e_d$ stand for a unit vector in d number of dimensions;
a respective attribute of the numeric type is denoted as $x_i$; and
the vectorized representation on the attribute of the numeric type is expressed as $e_{NE} = [X_i \cdot e_1, X_i \cdot e_2, \ldots, x_i \cdot e_d]$.

13. The computer-implemented method of claim 1, wherein performing the vectorized representation on a respective attribute comprises performing a vectorized representation on an attribute of a semantic type; and
performing the vectorized representation on the attribute of a semantic type comprises initialization encoding using a self-attention model;
wherein the computer-implemented method further comprises:
inputting an input data of m dimensions; and
encoding the input data and converting the input data into an encoded data of n dimensions; m and n are positive integers, n<m;
wherein the input data is the vectorized representation of attribute values generated by the self-attention model.

14. The computer-implemented method of claim 1, further comprising obtaining a product of a vectorized representation of a respective user and an updated vectorized representation of the individual entity;
wherein, in the updated vectorized representation of the individual entity, the flag bit is updated with a result of a neighborhood aggregate operation;
the product of the vectorized representation of the respective user and the updated vectorized representation of the individual entity is expressed as $\hat{y}_{uv} = ru \cdot V"$;
wherein ru stands for the vectorized representation of the respective user; and V" stands for the updated vectorized representation of the individual entity.

15. The computer-implemented method of claim 14, further comprising training the graph neural network model using a loss function expressed as:

$$L = \sum_{u \in U}\left(\sum_{v:y_{uv}=1} C(y_{uv}, \hat{y}_{uv}) - \sum_{v:y_{uv}=0}^{T^u} C(y_{uv}, \hat{y}_{uv})\right) + \lambda\|\varepsilon\|_2^2;$$

wherein C stands for a cross-entropy loss;
$\lambda\|\varepsilon\|_2^2$ denotes a L2 regularization of parameters of the graph neural network model;
$y_{uv}$ stands for a true label of a sample;
$\hat{y}_{uv}$ stands for an output of the graph neural network model; and
$T^u$ stands for a number of negative samples.

16. The computer-implemented method of claim 1, wherein the graph neural network is an item graph neural network model configured to recommend an item to a user;
the vectorized representation of the individual entity is a vectorized representation of a respective item; and
the respective item is an item that has a relationship, direct or indirect, with the user.

17. A method of item recommendation, comprising:
receiving a request for item recommendation from a user;
obtaining the user's preference probabilities for items based on the graph neural network model constructed according to the computer-implemented method of claim 1; and
outputting a list of item recommendations based on the preference probabilities.

18. The method of claim 17, wherein obtaining the user's preference probabilities for items based on the graph neural network model comprises:
determining similarities in relationship space between a respective item of the items and head entities of one or more adjacent triples, respectively, a respective head entity of the head entities being an entity having a direct relationship with the respective item;
obtaining a first order vectorized representation for the user by performing a weighted sum operation on tail entities of the one or more adjacent triples using the similarities as weights, respectively, thereby completing a first propagation;
reiterating the determining and obtaining process for (H−1) number of times along a propagation path in the graph neural network model, thereby obtaining an H order vectorized representation for the user, H-th being a positive integer, a tail entity in a previous propagation being a head entity in a present propagation along the propagation path; and
obtaining a product of the H-th order vectorized representation for the user and a vectorized representation of the respective item, thereby obtaining the user's preference probability with respect to the respective item.

19. An apparatus, comprising:
a memory;
one or more processors;
wherein the memory and the one or more processors are connected with each other; and
the memory stores computer-executable instructions for controlling the one or more processors to:
obtain one or more attributes of one or more entities;
perform a vectorized representation on a respective attribute of the one or more attributes, the vectorized representation being encoded as a vector of d dimensions; and
perform computation on vectorized representation of the one or more attributes based on attention mechanism to construct a graph neural network model;
wherein vectors of m number of dimensions are used to represent an individual entity in the graph neural network model, (m−1) dimensions out of m dimensions represent (m−1) number of attributes, and one out of the m dimensions represents a flag bit;
wherein, in constructing the graph neural network model, the memory stores computer-executable instructions for controlling the one or more processors to:
perform self-attention on the individual entity, during which the flag bit is converted into a fused flag bit by fusing the individual entity's own attributes;
update the fused flag bit during training of the graph neural network model so that the fused flag bit reflects changes in the entity's attributes;
apply the constructed graph neural network model including the fused flag bit in an item recommendation task to determine preference probabilities for items and to generate recommendation results; and
output, based on the preference probabilities, a ranked list of items for presentation to a user.

20. A computer-program product, comprising a non-transitory tangible computer-readable medium having computer-readable instructions thereon, the computer-readable instructions being executable by a processor to cause the processor to perform:
obtaining one or more attributes of one or more entities;
performing a vectorized representation on a respective attribute of the one or more attributes, the vectorized representation being encoded as a vector of d dimensions; and
performing computation on vectorized representation of the one or more attributes based on attention mechanism to construct a graph neural network model;
wherein vectors of m number of dimensions are used to represent an individual entity in the graph neural network model, (m−1) dimensions out of m dimensions represent (m−1) number of attributes, and one out of the m dimensions represents a flag bit;
wherein constructing the graph neural network model comprises:
performing self-attention on the individual entity, during which the flag bit is converted into a fused flag bit by fusing the individual entity's own attributes;
updating the fused flag bit during training of the graph neural network model so that the fused flag bit reflects changes in the entity's attributes;
applying the constructed graph neural network model including the fused flag bit in an item recommendation task to determine preference probabilities for items and to generate recommendation results; and
outputting, based on the preference probabilities, a ranked list of items for presentation to a user.

* * * * *